United States Patent [19]

Sugo et al.

[11] Patent Number: 5,648,400

[45] Date of Patent: Jul. 15, 1997

[54] PROCESS FOR PRODUCING POLYMERIC ELECTROLYTE COMPLEX AND ION-EXCHANGE RESIN

[75] Inventors: Takanobu Sugo, Gunma-ken; Satoshi Tanaka; Tsuyoshi Tsutsui, both of Niigata-ken, all of Japan

[73] Assignees: Japan Atomic Energy Research Inst.; Nikki Chemical Co., Ltd., both of Tokyo, Japan

[21] Appl. No.: 491,307

[22] Filed: Jun. 16, 1995

Related U.S. Application Data

[63] Continuation of Ser. No. 337,452, Nov. 4, 1994, abandoned, and Ser. No. 99,455, Jul. 30, 1993, abandoned.

[30] Foreign Application Priority Data

Aug. 4, 1992 [JP] Japan .................. 4-208043
Aug. 4, 1992 [JP] Japan .................. 4-208046

[51] Int. Cl.$^6$ .................. C08F 8/32; C08F 8/36; B01J 43/00
[52] U.S. Cl. .................. 521/30; 521/27; 521/32; 521/33; 525/353; 525/374; 525/379
[58] Field of Search .................. 521/30, 27, 32, 521/33; 525/353, 374, 379

[56] References Cited

U.S. PATENT DOCUMENTS

| | | | |
|---|---|---|---|
| 4,298,698 | 11/1981 | Kawase | 521/27 |
| 4,481,306 | 11/1984 | Markus | 521/31 |
| 4,500,396 | 2/1985 | D'Agostino | 204/107 |
| 4,642,601 | 2/1987 | Sugawara | 338/35 |
| 5,075,342 | 12/1991 | Ishigaki | 521/27 |

*Primary Examiner*—Fred Zitomer
*Attorney, Agent, or Firm*—Banner & Witcoff, Ltd.

[57] ABSTRACT

A monomer having cationic groups and a monomer having anionic groups are introduced into polymeric substrates such as fibers, woven fabrics, nonwoven fabrics and membranous materials through radiation-initiated graft polymerization, thereby producing polymeric electrolyte complexes that have good physical properties and which can be formed into shapes that suit specific uses. Also disclosed is a process according to which hydrophilic groups and/or ion-exchange groups are introduced into polymeric substrates such as fibers, woven fabrics, nonwoven fabrics and membranous materials through radiation-initiated graft polymerization. To introduce hydrophilic groups and/or ion-exchange groups, two or more monomers are used as selected from among hydrophilic monomers, monomers having cation-exchange groups (e.g. acrylic acid, methacrylic acid and styrenesulfonic acid salt), and monomers having anion-exchange groups (e.g. vinylbenzyltrimethyl ammonium salt and diethylaminoethyl methacrylate).

1 Claim, No Drawings

PROCESS FOR PRODUCING POLYMERIC ELECTROLYTE COMPLEX AND ION-EXCHANGE RESIN

This application is a continuation of application Ser. Nos. 08/099,455 and 08/337,452, filed Jul. 30, 1993 and Nov. 4, 1994, respectively, both abandoned.

BACKGROUND OF THE INVENTION

According to its first aspect, this invention relates to a process for producing an industrially useful polymeric electrolyte complex by radiation-initiated graft copolymerization.

Polymeric electrolyte complexes, also known as "polyion complexes", have polycations and polyanions associated by ionic crosslinking so as to form a gel. Included within a class of polyion complexes that have been studied comprehensively for the possibility of practical applications are those which are formed from poly(styrenesulfonic acid) salts and poly(vinylbenzyltrimethyl ammonium) salts. These complexes are produced by mixing dilute solutions of the two components and they are then coated onto films by a casting method using a three-component solvent system composed of water, a polar solvent and a low-molecular weight salt, or onto other materials by a dip casting method. The complexes can also be produced by dipping sodium styrenesulfonate SSS in a particulate poly(vinylbenzyltrimethyl ammonium chloride) (VBTAC) resin and then polymerizing the mixture. The complexes produced by this method are used as snake cage resins.

The polyion complexes produced by these conventional methods have problems with physical properties as exemplified by low heat resistance, as well as by stiffness and brittleness in a dry state due to the lack of flexibility. Furthermore, when those complexes are coated onto substrates such as woven or nonwoven fabrics, their interstices are filled with the complexes and it often occurs that the substrates fail to exhibit their characteristics to the fullest extent. With a view to solving the afore-mentioned problems associated with physical properties and processability, one may attempt to attach styrene, chloromethylstyrene, vinylbenzyl dialkylamine or other monomers onto shaped substrates such as woven fabrics, nonwoven fabrics and nets by radiation-initiated graft polymerization and then introduce a quaternary ammonium group and a sulfone group into the polymer. However, this approach involves certain problems such as the occurrence of a side reaction due to the introduction of functional groups and the difficulty in controlling the amount of functional groups being introduced.

SUMMARY OF THE INVENTION

Hence, the purpose of the first aspect of the present invention is to provide a process for producing a polymeric electrolyte complex that has good physical properties and that can be formed into shapes that suit specific uses.

This object can be attained by a process that comprises exposing a shaped organic polymer to an ionizing radiation and thereafter introducing cationic and anionic groups into the polymer by means of graft copolymerization of a monomer having cationic groups and a monomer having anionic groups.

The substrate to be used in the present invention is advantageously made of a material selected from among polyolefins such as polyethylene and polypropylene, and halogenated polyolefins. It should, however, be noted that these are not the sole examples of the substrate materials that can be used. Radiation-initiated graft polymerization permits the shape of substrates to be selected fairly freely and, hence, it offers the advantage of providing a great latitude in the selection of substrate shapes that suit a specific use.

Ionizing radiations that can be used in radiation-initiated graft polymerization include $\alpha$-, $\beta$-, $\gamma$-rays, electron beams and uv rays. While any of these radiations can be used, $\gamma$-rays and electron beams are suitable for the purpose of the present invention. Depending on the substrate, the exposure dose ranges generally from 50 kGy to 300 kGy, preferably from 100 kGy to 200 kGy. If the irradiation is insufficient, radicals cannot be generated in the necessary amount to effect the intended graft polymerization. Excessive irradiation is not only uneconomical but also incapable of achieving the intended graft polymerization for various reasons such as unnecessary crosslinking of the substrate and partial decomposition of the same.

The substrate can be exposed to radiations by either a simultaneous irradiation method in which radiations are applied in the presence of both the substrate and the necessary monomers, or by a pre-irradiation method in which irradiation of the substrate is followed by contact with the necessary monomers. The pre-irradiation method is more advantageous since it causes less formation of homopolymers of the monomers.

The monomers to be used in the present invention are exemplified by, but not limited to, a vinylbenzyltrimethyl ammonium salt as a monomer having cationic groups and a styrenesulfonic acid salt as a monomer having anionic groups.

Graft polymerization on the preliminarily irradiated substrate can be accomplished by merely bringing the substrate into contact with solutions of the monomers in a liquid phase in the absence of oxygen. The time of contact with the monomer solutions varies with the type of substrate or the exposure dose, and a satisfactory graft polymer is produced by contact for 3–5 hours. Even if monomers other than SSS and VBTAC are graft polymerized on the irradiated substrate in a vapor phase or in an as-impregnated state, the graft polymer may subsequently be reacted with the SSS and VBTAC monomers if a sufficient amount of radicals remain unused in the polymer.

The reaction temperature is generally in the range from 30° C. to 80° C., preferably from 50° C. to 70° C.

The first aspect of the present invention offers the advantage that both cationic and anionic groups can be introduced into variously shaped organic polymers by merely performing radiation-initiated graft polymerization through pre-irradiation, whereby a polymeric electrolyte complex having excellent physical properties can be produced. Thus, the process of the present invention enables polymeric electrolyte complexes to be produced with a great latitude in the selection of shapes while exhibiting excellent physical properties.

According to its second aspect, the present invention relates to a process for producing an industrially useful ion-exchange resin by radiation-initiated graft copolymerization.

Ion-exchange resins are used extensively in various industries. Most of the conventional ion-exchange resins have ion-exchange groups introduced into the copolymer of styrene and divinylbenzene. In order to introduce sulfonic acid groups as cation-exchange groups, reaction must be carried out in either concentrated sulfuric acid or chlorosulfuric acid under extremely hostile conditions (i.e., at elevated temperatures for prolonged periods) and this has damaged or otherwise deteriorated the substrate by lowering its physical strength or causing low-molecular weight substances to dissolve out. The substrate may be crosslinked to provide sufficient strength to withstand the sulfonation step but then it is very difficult to shape. Hence, except in the case of ion-exchange membranes, almost all of the crosslinked substrates are in the form of spheres or fine particles.

With a view to solving the problem of shaping and processing, it has been proposed that sulfone groups be introduced into substrates after they are shaped and processed into woven fabrics, nonwoven fabrics, nets, etc., followed by radiation-initiated graft polymerization of styrene or glycidyl methacrylate. However, the above-mentioned problems associated with substrate deterioration have not been solved by this method since in the case of graft polymerization of styrene, sulfonation with concentrated sulfuric acid or chlorosulfuric acid must be performed after the polymerization. In the case of graft polymerization of glycidyl methacrylate, sulfone groups can be introduced by performing reaction with an aqueous solution of sodium sulfite but the so treated substrate has ester bonds and involves problems with chemical stability depending on the use conditions.

The technique of graft polymerizing a styrenesulfonic acid salt as a monomer having sulfone groups has also been proposed. However, the styrenesulfonic acid salt is difficult to graft polymerize by itself and two-stage graft polymerization must be performed; but then each of the irradiation and reaction steps has to be effected twice, making the process very uneconomical and hardly practical.

In order to introduce quaternary ammonium groups as anion-exchange groups, the chloromethylation of a styrene divinylbenzene copolymer is followed by treatment with trimethylamine. However, the chloromethylation of a styrene-divinylbenzene requires the use of carcinogenic chloromethylether and, furthermore, trimethylamine which is a malodorous substance designated by law is used in the quaternization step. Under the circumstances, the production of the intended ion-exchange resin is not easy to accomplish since it is necessary to adopt a process that will not cause any deleterious effects on the environment.

After the shaped substrate is subjected to radiation-initiated graft polymerization of styrene, chloromethylstyrene or glycidyl methacrylate, quaternary ammonium groups can be introduced. However, as already mentioned, chloromethylation and the introduction of quaternary ammonium groups is not easy to accomplish after graft polymerization of styrene. Chloromethylstyrene is a lacrimatory monomer and difficult to handle. In the case of graft polymerization of glycidyl methacrylate, quaternary ammonium groups can be introduced by reaction with a trimethylamine HCl salt but, then, there are problems associated with chemical stability and endurance.

It is difficult to accomplish direct graft polymerization onto substrates of a vinylbenzyltrimethyl ammonium salt as a monomer having quaternary ammonium groups.

Hence, the purpose of the second aspect of the present invention is to provide a process by which an ion-exchange resin can be produced while satisfying the following conditions that have not been met by the prior art, namely, the introduction of ion-exchange groups under mild conditions, the ease of shaping and processing into forms that suit specific uses, and the chemical stability of resin's structure.

This object can be attained by a process that comprises exposing a shaped organic polymer to an ionizing radiation and thereafter introducing ion-exchange groups into the polymer by graft copolymerization of the combination of two or more monomers as selected from among a hydrophilic monomer, a monomer having cation-exchange groups and a monomer having anion-exchange groups.

The graft polymerization of a styrenesulfonic acid salt or a vinylbenzyltrimethyl ammonium salt onto hydrophobic substrates will not proceed efficiently if these monomers are used alone. On the other hand, If they are subjected to graft polymerization in the presence of a hydrophilic monomer, the graft polymerization of the hydrophilic monomer will render the hydrophobic substrate hydrophilic and the existing styrenesulfonic acid salt or vinylbenzyltrimethyl ammonium salt will undergo efficient progress of graft polymerization onto the substrate.

The substrate to be used in the present invention is advantageously made of a material selected from among polyolefins such as polyethylene and polypropylene, and halogenated polyolefins. It should, however, be noted that these are not the sole examples of the substrate materials that can be used. Radiation-initiated graft polymerization permits the shape of substrates to be selected fairly freely and, hence, it offers the advantage of providing a great latitude in the selection of substrate shapes that suit a specific use.

Ionizing radiations that can be used in radiation-initiated graft polymerization include $\alpha$-, $\beta$-, $\gamma$-rays, electron beams and uv rays. While any of these radiations can be used, $\gamma$-rays and electron beams are suitable for the purpose of the present invention. Depending on the substrate, the exposure dose ranges generally from 50 kGy to 300 kGy, preferably from 100 kGy to 200 kGy. If the irradiation is insufficient, radicals cannot be generated in the necessary amount to effect the intended graft polymerization. Excessive irradiation is not only uneconomical but also incapable of achieving the intended graft polymerization for various reasons such as unnecessary crosslinking of the substrate and partial decomposition of the same.

The substrate can be exposed to radiations by either a simultaneous irradiation method in which radiations are applied in the presence of both the substrate and the necessary monomers, or by a pre-irradiation method in which irradiation of the substrate is followed by contact with the necessary monomers. The pre-irradiation method is more advantageous since it causes less formation of homopolymers of the monomers.

The monomers to be used in the present invention are listed below. Hydrophilic monomers are exemplified by, but not limited to hydroxyethyl methacrylate, vinylpyrrolidone and dimethylacrylamide; monomers having cation-exchange groups are exemplified by, but not limited to, acrylic acid, methacrylic acid and styrenesulfonic acid salt; and monomers having anion-exchange groups are exemplified by, but not limited to, vinylbenzyltrimethyl ammonium salt and diethylaminoethyl methacrylate. Acrylic acid, methacrylic acid and diethylaminoethyl methacrylate can also be used as hydrophilic monomers.

Graft polymerization on the preliminarily irradiated substrate can be accomplished by merely bringing the substrate into contact with solutions of the monomers in a liquid phase in the absence of oxygen. Alternatively, the substrate may be impregnated with the monomer solutions under the same conditions. The time of contact with the monomer solutions varies with the type of substrate or the exposure dose; in the case of graft polymerization in an as-impregnated state, two hours will suffice for the reaction to be completed whereas, in the case of graft polymerization in a liquid phase, satisfactory reaction can be performed in 3–5 hours.

The reaction temperature ranges preferably from 30° C. to 50° C. in the case of graft polymerization in an as-impregnated state; in the case of graft polymerization in a liquid phase, the reaction temperature is generally in the range from 30° C. to 80° C., preferably from 50° C. to 70° C.

The second aspect of the present invention offers the advantage that the necessary ion-exchange groups can be introduced variously shaped organic polymers by merely performing radiation-initiated graft polymerization without involving an extra step of introducing ion-exchange groups as after graft polymerizing styrene or glycidyl methacrylate. Thus, the process of the present invention enables direct graft copolymerization of a styrenesulfonic acid salt or vinylbenzyltrimethyl ammonium salt, thereby making it possible to provide a great latitude in the selection of substrate's shape and eliminate the need for performing the additional step of introducing ion-exchange groups after graft polymerization (these features have been difficult to attain by the conventional processes for the manufacture of ion-exchange resins).

DETAILED DESCRIPTION OF THE PREFERRED EMBODIMENTS

The following examples are provided for the purpose of further illustrating the present invention but are in no way to be taken as limiting.

Example 1

A nonwoven fabric of polypropylene fibers having a diameter of 40 μm was exposed to accelerated electron beams for a total dose of 200 kGy. Thereafter, the substrate was subjected to reaction at 50° C. for 2.5 h in a 36% aqueous solution of a deoxidized mixture of sodium styrenesulfonate, trimethylvinylbenzyl ammonium salt and acrylic acid, whereby a polymeric electrolyte complex grafted nonwoven fabric was produced in a graft yield of 61%.

Example 2

A nonwoven fabric of polypropylene fibers to which polyvinyl alcohol was grafted was exposed to accelerated electron beams for a total dose of 100 kGy. Thereafter, the substrate was subjected to reaction at 70° C. for 3 h in a 10% aqueous solution of a deoxidized mixture of sodium styrenesulfonate and trimethylvinylbenzyl ammonium salt, whereby a polymeric electrolyte complex grafted nonwoven fabric was produced in a graft yield of 133%.

Example 3

A 15-μm thick film of an ethylene-vinyl alcohol copolymer was exposed to accelerated electron beams for a total dose of 100 kGy. Thereafter, the substrate was subjected to reaction at 70° C. for 2.5 h in a 10% aqueous solution of a deoxidized mixture of sodium styrenesulfonate and trimethylvinylbenzyl ammonium salt, whereby a polymeric electrolyte complex grafted film was produced in a graft yield of 60%.

Example 4

A nonwoven fabric of polypropylene fibers having a diameter of 40 μm was exposed to accelerated electron beams for a total dose of 200 kGy. Thereafter, the substrate was subjected to reaction at 50° C. for 2.5 h in a 33% aqueous solution of a deoxidized mixture of acrylic acid and sodium styrenesulfonate to achieve a graft yield of 170%. The resulting graft polymer was a cation-exchange resin having 2.0 meq/g of strong acid sulfone groups and 3.0 meq/g of weak acid carboxyl groups.

Comparative Example 1

An attempt was made to perform graft polymerization under the same conditions as in Example 4 except that the reaction system was solely composed of an aqueous solution of sodium styrene-sulfonate. As it turned out, there was no progress of polymerization.

Example 5

A nonwoven fabric of polypropylene fibers having a diameter of 40 μm was exposed to accelerated electron beams for a total dose of 200 kGy. Thereafter, the substrate was impregnated in a solution of a mixture of acrylic acid and sodium styrenesulfonate. With the residue being removed, the substrate was put into a reaction vessel, deoxidized and subjected to reaction at 40° C. for 2 h to achieve a graft yield of 135%. The resulting graft polymer was a cation-exchange resin having 1.2 meq/g of sulfone groups and 3.6 meq/g of carboxyl groups.

Comparative Example 2

An attempt was made to perform graft polymerization under the same conditions as in Example 5 except that the reaction system was solely composed of an aqueous solution of styrenesulfonic acid salt. As it turned out, there was no progress of polymerization.

Example 6

A low-density polyethylene membrane 50 μm thick was exposed to accelerated electron beams for a total dose of 200 kGy. Thereafter, the substrate was subjected to reaction at 70° C. for 3 h in a solution of a deoxidized mixture of hydroxyethyl methacrylate and a vinylbenzyltrimethyl ammonium salt to attain a graft yield of 158%. The resulting graft polymer had 1.4 meq/g of strong base quaternary ammonium salts.

Comparative Example 3

An attempt was made to perform graft polymerization under the same conditions as in Example 6 except that the reaction system was solely composed of an aqueous solution of vinylbenzyltrimethyl ammonium salt. As it turned out, there was no progress of polymerization.

Example 7

Polyethylene beads having a diameter of 2 mm were exposed to accelerated electron beams for a total dose of 200 kGy. Thereafter, the substrate was subjected to reaction at 50° C. for 5 h in a solution of a deoxidized mixture of acrylic acid, sodium styrenesulfonate and vinylbenzyltrimethyl ammonium salt to produce a graft polymer in a graft yield of 52%.

What is claimed is:

1. An ion exchange resin having a cation exchange group, an anion exchange group and a hydrophilic group produced by exposing a hydrophobic polymeric fabric of polyolefins or halogenated polyolefins to an ionizing radiation and introducing the hydrophilic group and the ion exchange groups into the fabric through co-grafting polymerization of a monomer having a cation exchange group and a monomer having an anion exchange group in the presence of a hydrophilic monomer, wherein the monomer having an anion exchange group is a vinylbenzyltrimethyl ammonium salt, the monomer having a cation exchange group is a styrenesulfonic acid salt, and the hydrophilic monomer is dimethylacrylamide, and wherein the fabric is a woven or nonwoven fabric.

* * * * *